United States Patent
De-Clercq et al.

(10) Patent No.: US 12,212,199 B2
(45) Date of Patent: Jan. 28, 2025

(54) STATOR WITH PINS FOR AN ELECTRIC MACHINE

(71) Applicant: Valeo Siemens eAutomotive Germany GmbH, Erlangen (DE)

(72) Inventors: Stephane De-Clercq, Rang du Fliers (FR); Wojciech Mandok, Czechowice-Dziedzice (PL); Christian Finger-Albert, Bad Kissingen (DE); Boris Dotz, Munich (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 254 days.

(21) Appl. No.: 17/642,405

(22) PCT Filed: Sep. 8, 2020

(86) PCT No.: PCT/EP2020/075012
§ 371 (c)(1),
(2) Date: Mar. 11, 2022

(87) PCT Pub. No.: WO2021/048086
PCT Pub. Date: Mar. 18, 2021

(65) Prior Publication Data
US 2022/0337114 A1    Oct. 20, 2022

(30) Foreign Application Priority Data
Sep. 11, 2019    (DE) .............. 10 2019 124 464.1

(51) Int. Cl.
*H02K 3/28*    (2006.01)
*H02K 3/14*    (2006.01)
*H02K 3/52*    (2006.01)

(52) U.S. Cl.
CPC ............. *H02K 3/14* (2013.01); *H02K 3/28* (2013.01); *H02K 3/521* (2013.01)

(58) Field of Classification Search
CPC ............. H02K 15/064; H02K 15/0421; H02K 15/0478; H02K 15/085; H02K 1/165;
(Continued)

(56) References Cited

U.S. PATENT DOCUMENTS 6,894,417 B2 * 5/2005 Cai .................. H02K 3/12
310/201
7,005,773 B2   2/2006 Nakamura
(Continued)

FOREIGN PATENT DOCUMENTS

CN     104426257 A     3/2015
CN     105191071 A    12/2015
(Continued)

OTHER PUBLICATIONS

International Search Report and Written Opinion in corresponding International Application No. PCT/EP2020/075012, mailed Dec. 11, 2020 (12 pages).
(Continued)

*Primary Examiner* — Bryan R Perez
(74) *Attorney, Agent, or Firm* — Osha Bergman Watanabe & Burton LLP

(57) ABSTRACT

A stator for an electric machine having a plurality of pins, which are arranged on concentric circles at different distances from a stator center point in slots in the stator, and each concentric circle forms a layer, where four pins in different layers are connected to one another in series and form a winding. A first pin of the winding is located in a first slot in the 4n-3 layer, wherein n is a natural number, a second pin of the winding is located in a second slot in the 4n-2 layer, wherein the second slot is at a first radial distance from the first slot in a first circumferential direction of the stator,
(Continued)

a third pin of the winding is located in the first slot in the 4n layer, and a fourth pin of the winding is located in the second slot in the 4n-3 layer.

16 Claims, 13 Drawing Sheets

(58) Field of Classification Search
CPC .......... H02K 1/16; H02K 1/2791; H02K 1/27; H02K 3/28; H02K 3/12; H02K 3/04; H02K 3/50; H02K 3/18; H02K 3/14
See application file for complete search history.

(56) References Cited

U.S. PATENT DOCUMENTS

| | | |
|---|---|---|
| 9,136,738 B2 | 9/2015 | Ikeda et al. |
| 11,489,389 B2 * | 11/2022 | Dotz ........................ H02K 3/28 |
| 2003/0015932 A1 | 1/2003 | Oohashi et al. |
| 2011/0025162 A1 | 2/2011 | Naganawa et al. |

FOREIGN PATENT DOCUMENTS

| | | |
|---|---|---|
| CN | 207265747 U | 4/2018 |
| DE | 60029294 T2 | 7/2007 |
| DE | 102010053719 A1 | 6/2012 |
| DE | 112013006691 T5 | 10/2015 |
| EP | 3096441 A1 | 11/2016 |
| JP | 2010531127 A | 9/2010 |
| JP | 2010252438 A | 11/2010 |
| JP | 201136009 A | 2/2011 |
| JP | 201888729 A | 6/2018 |
| WO | 2012/072754 A2 | 6/2012 |
| WO | 2015079732 A1 | 6/2015 |

OTHER PUBLICATIONS

Office Action issued in counterpart Chinese Application No. 202080073198.X, dated Oct. 28, 2023 (10 pages).
Office Action issued in counterpart Japanese Application No. 2022-515988, dated Jun. 19, 2023, with English translation (14 pages).
German Search Report in corresponding German Application No. 10 2019 124 464.1, dated Jun. 30, 2020 (8 pages).

* cited by examiner

STATOR WITH PINS FOR AN ELECTRIC MACHINE

PRIOR ART

Electric machines are generally known and are being increasingly used as electric motors for the driving of vehicles. An electric machine consists of a stator and a rotor.

The stator comprises a multiplicity of slots, in which the windings are guided. The windings may be formed from isolated copper rods in the form of what are referred to as pins. The rotor is located in the stator and is connected to a rotor shaft.

Such a pin motor, U-pin motor or hairpin motor is known, for example, from U.S. Pat. No. 9,136,738 B2.

PROBLEM AND SOLUTION

The object of the present invention is to provide a stator having windings composed of pins, which is easy to manufacture.

According to the invention, the stator for an electric machine comprises a multiplicity of pins, which are arranged on concentric circles at different distances from a stator center point (M) in slots in the stator, and each concentric circle forms a layer; wherein four pins in different layers are connected to one another in series and form a winding. A first pin of the winding is located in a first slot in the 4n-3 layer, wherein n is a natural number; a second pin of the winding is located in a second slot in the 4n-2 layer, wherein the second slot is at a first radial distance from the first slot in a first circumferential direction of the stator; a third pin of the winding is located in the first slot in the 4n layer; a fourth pin of the winding is located in the second slot in the 4n-1 layer.

A stator having the winding according to the invention can be produced easily and generates an efficient electromagnetic field. The types of connection produce an electrically conductive connection between the pins in the slots. The type of connection may be the welding of conductors onto the pins or the pins may already be in the form of a double pin or what is referred to as a U-pin, and thereby already produce a connection when inserted into the stator. The welding together of end portions of pins that are bent toward one another also constitutes a type of connection.

The layers can be numbered in increasing order from the outside to the inside in relation to the stator center point.

Preferably the stator comprise a first and a second end face; and for the first and the second pin to be connected to one another on the second end face by means of a first type of connection; for the second and the third pin to be connected to one another on the first end face by means of a second type of connection; for the third and the fourth pin to be connected to one another on the second end face by means of a third type of connection; wherein the first, second and third types of connection differ from one another.

The different types of connection make improved manufacture possible. Alternating the position of the types of connection on different end faces makes it possible to efficiently form a winding around the stator teeth lying between the slots.

Even types of connection on the same end face of the stator may differ by virtue of a pin foot being bent in different directions in relation to the stator interior or exterior.

A combination of the above-mentioned types of connection on different or the same end faces of the stator is also possible. The same type of connection on the same end faces and different types of connection on different end faces of the stator makes easy and quick manufacture possible. For example, on one end face the connection is produced by virtue of a type of pre-bent pins, what are referred to as double pins or else U-pins, and on another end face of the stator single pins or respective sides of the double pin are welded to one another. The weld points may lie at feet of the pins or double pins.

In one embodiment of the invention, the stator may comprise at least two windings and at least the fourth pin in the second slot may be connected to a fifth pin in the 4n-3 layer in a third slot by means of a fourth type of connection.

It is furthermore preferably possible for the stator to comprise a multiplicity of windings, which extend over the entire circumference of the stator and thereby form a part-coil.

This means that the windings have a symmetry which creates a uniform revolving field.

In a further embodiment, respective pins of two part-coils may be connected to one another by means of a fifth type of connection.

The fifth type of connection may be realized for example by a specially bent pin.

It is preferably possible for at least two part-coils to form a coil.

It is furthermore preferably possible for respective pins of two coils to be connected to one another by means of a sixth type of connection.

The sixth type of connection may be produced by a conductor attached to the pins or by a conductive ring.

The two coils may be connected in parallel and may additionally be fed by the same phase. The parallel connection may be effected by connecting a first and a fifth or a fourth and an eighth end pin in pairs.

The two coils may be connected in parallel and may additionally be fed by the same phase.

In a preferred embodiment of the invention, the part-coils may form six coils and six phases may be assigned to them in such a way that two coils, which are assigned to different phases, are respectively located in adjacent slots.

It is furthermore possible for two phases to respectively have an approximately identical current and voltage profile, and as a result for a six-phase inverter to control only a three-phase motor. This arrangement makes a current division of the switching elements in the inverter possible.

It is preferably possible for respective further pins of the two coils to be connected to one another and for the two coils as a result to be connected in parallel, and in particular assigned to one phase.

Two coils of adjacent slots may thus be connected in parallel and fed by one phase, resulting in a stator having windings for a three-phase electric machine.

In one embodiment, the second type of connection may comprise a first double pin, which is formed from the second pin and the third pin, wherein the first double pin has two inwardly bent pin feet with a respective weld point and bridges a first radial distance.

The double pin may be inserted into the stator from one end face and be welded to a further double pin on the other end face.

It is preferably possible for the fourth type of connection to comprise a second double pin, which is formed from the fourth pin and the fifth pin, wherein the second double pin has two outwardly bent pin feet with a respective weld point and bridges a first radial distance.

The first distance describes a number of slots to be bridged. The actual spatial distance to be bridged depends on the position of the pins in the layer, because the double pins connect different layers.

It is furthermore preferably possible for the fifth type of connection to comprise a third double pin, which is formed from two first end pins, wherein the third double pin has two pin feet (63b, 61b), which are bent in the same direction and have a respective weld point, and bridges a second radial distance.

The second radial distance may be at least one slot shorter than the first radial distance.

In one embodiment of the invention, a single pin may comprise a second end pin and a pin foot which is bent clockwise.

It is preferably possible for the first type of connection to be formed by a welded connection between a first weld point at the pin foot of the second double pin or of the first single pin and a second weld point at the pin foot of the first double pin or of the third double pin.

In a further embodiment, the third type of connection may be formed by a welded connection between a third weld point at the pin foot of the first double pin or of the second single pin and a fourth weld point at the pin foot of the second double pin or of the third double pin.

According to the invention, a vehicle (103) comprises an electric machine with a stator according to one of the preferred embodiments.

DESCRIPTION OF THE FIGURES

FIG. 1 shows a stator 1 having a multiplicity of slots 5 in which pins 3 are guided. The stator has a first end face 7 and a second end face 9. In addition, an interface 11, by means of which the stator can be connected to an inverter, is located on the first end face 7. The interface 11 is connected to the pins by means of a sixth type of connection 66. Of course, a rotor is also necessary for the operation of an electric machine.

FIG. 2 shows a stator 1 having slots 51, 52, 53, 54, 55, 56, 57 and pins 21, 22, 23, 24 on four layers, only eight slots being illustrated. The pins are arranged in the slots. The pins lie next to one another in a slot; in the example of FIG. 2, four pins lie next to one another in a slot. The four pins within one slot therefore lie on different concentric circles L1, L2, L3, L4 around the center point M of the stator, which circles thus form individual layers. There is a distance 71 between two respective slots. This distance 71 is identical between all of the slots shown in FIG. 2.

FIG. 3 shows the stator 1 from FIG. 2. The pins are still arranged on concentric circles, that is to say layers, the concentric circles not being depicted for the sake of better illustration. FIG. 3 illustrates which pins are connected to one another in series. For the sake of better clarity, pins are located only in the rectangles filled in in black. The white rectangles are not taken into account in this figure and merely clarify the layer in which the described pins are located. A first pin 21 is located in a first slot 51 in the layer L1. This first pin 21 is connected to a second pin 22 in the slot 52 by means of a first type of connection 61, illustrated as a dotted line. The second pin 22 is located in the layer L2. The second pin 22 is connected to a third pin 23 in the slot 51 by means of a second type of connection 62, illustrated as a short-dashed line. The third pin 23 is located in turn in the first slot 51, that is to say in the same slot as the first pin 21. The third pin 23, however, lies in the layer L4. Consequently, there is still space for two further pins between the first pin 21 and the third pin 23 in the slot 51. This is illustrated by two white rectangles in the form of placeholders. The third pin 23 is connected to a fourth pin 24 via a third type of connection 63, illustrated as a solid line. The fourth pin 24 lies in the same slot 52 as the second pin 22. The fourth pin 24 lies in the layer L3 directly next to the second pin 22. Consequently, there is still space for two further pins in layers L1 and L4 next to the two pins 22, 24 in the slot 52. This is illustrated by two white rectangles in the form of placeholders. The four pins 21, 22, 23, 24 with their connections, which are produced by different types of connection 61, 62, 63, form a first winding 41.

Figure 1:
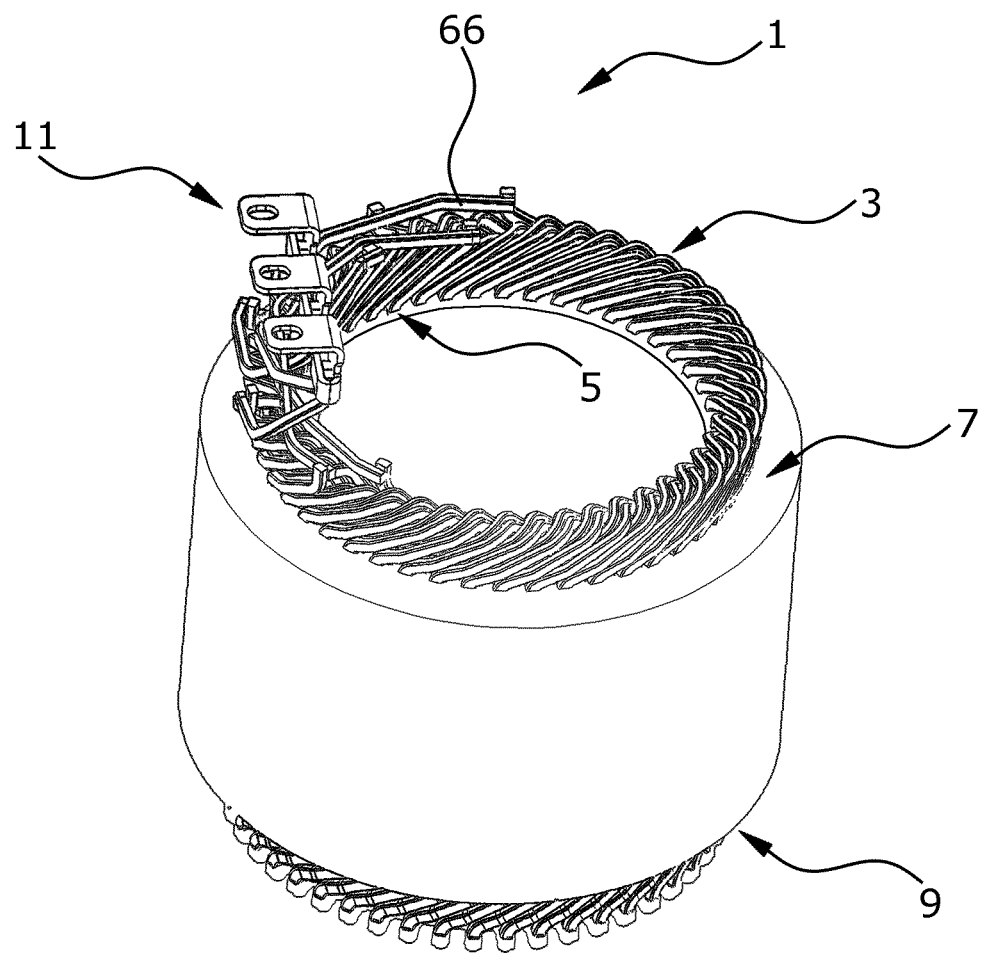
FIG. 1 shows a stator.
Figure 2:
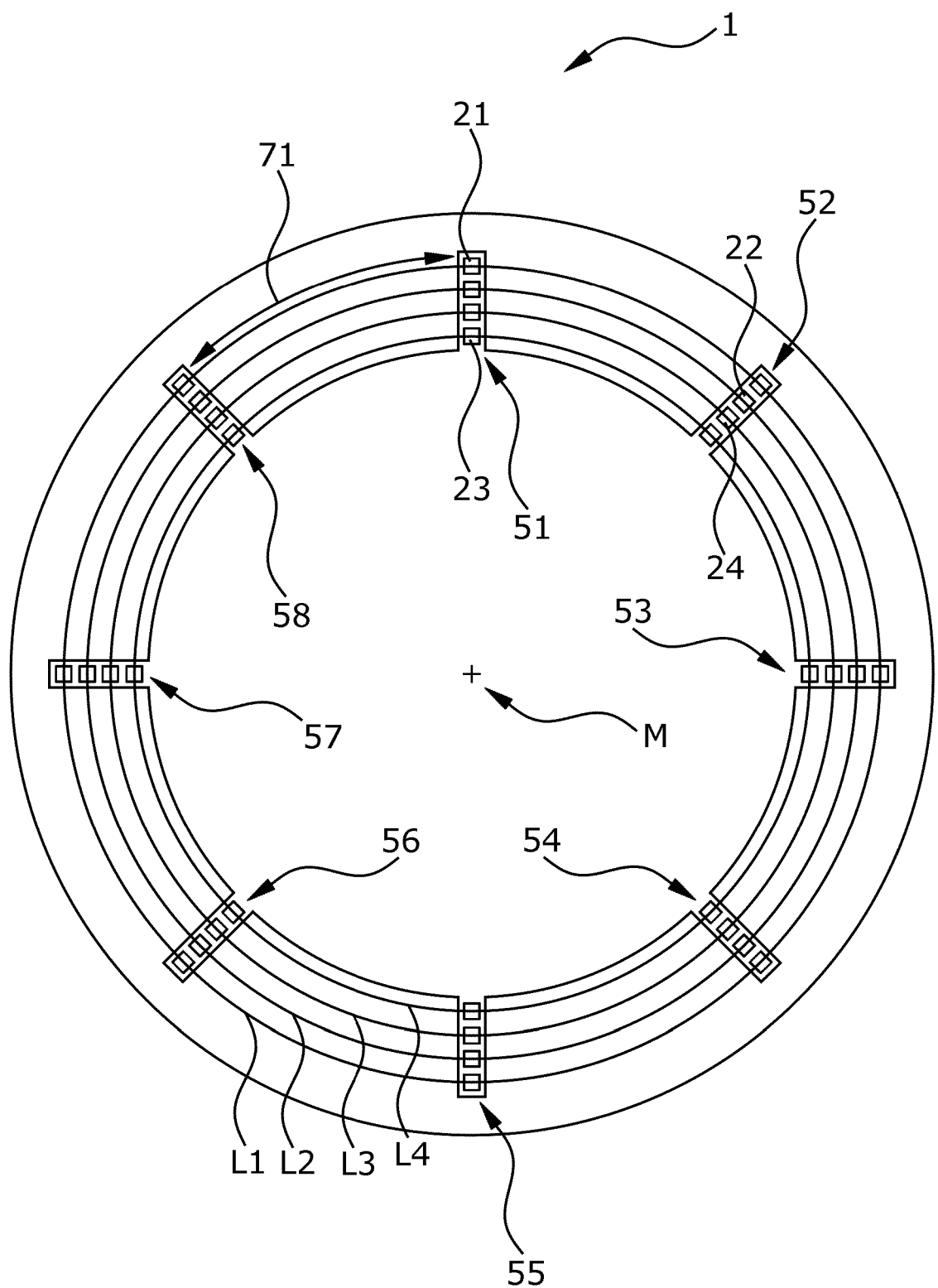
FIG. 2 shows a stator having eight slots and four layers.

The fourth pin 24 is connected to a fifth pin 25 in a third slot 53 via a fourth type of connection 64, illustrated as a long-dashed line. With the fifth pin 25, the above-described serial connection of the subsequent pins in the stator begins again, with the position of the fifth pin 25 having been rotated anticlockwise by 90 degrees in relation to the position of the first pin 21.

The serial connection of the fifth pin 25 to further pins in the slots 53 and 54 forms a second winding 42. The first, second and third types of connection 61, 62, 63 between these pins are identical to the respective first, second and third types of connection 61, 62, 63 of the pins of the first winding 41.

The two windings 41, 42 are connected by the fourth type of connection 64. The continuation of the serial connection forms the winding 43 in the slots 55, 56 and the winding 44 in the slots 57, 58. The windings 42, 43, 44 are respectively connected by means of the fourth type of connection 64. The fourth type of connection 64 between the respective windings 41, 42, 43, 44 is therefore identical. It is also the case that the first, second and third types of connection 61, 62, 63 between the pins of the windings 43, 44 are identical to the first, second and third types of connection 61, 62, 63 of the windings 41, 42.

The four windings 41, 42, 43, 44 form a first part-coil by way of an anticlockwise circuit around the stator 1. The last pin in this part-coil is the end pin 26.

Figure 3:
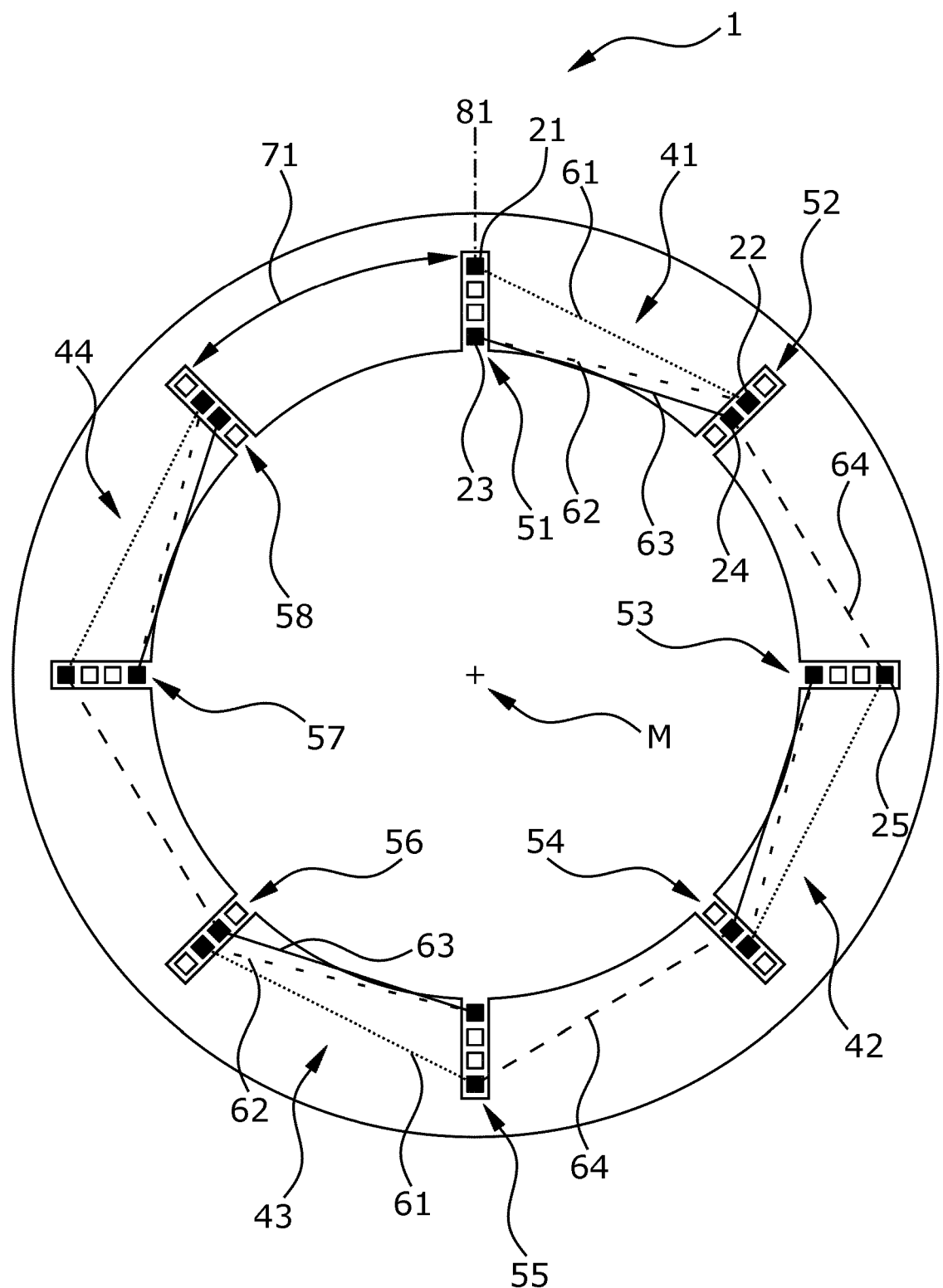
FIG. 3 shows a winding pattern of a first part-coil.
Figure 4:
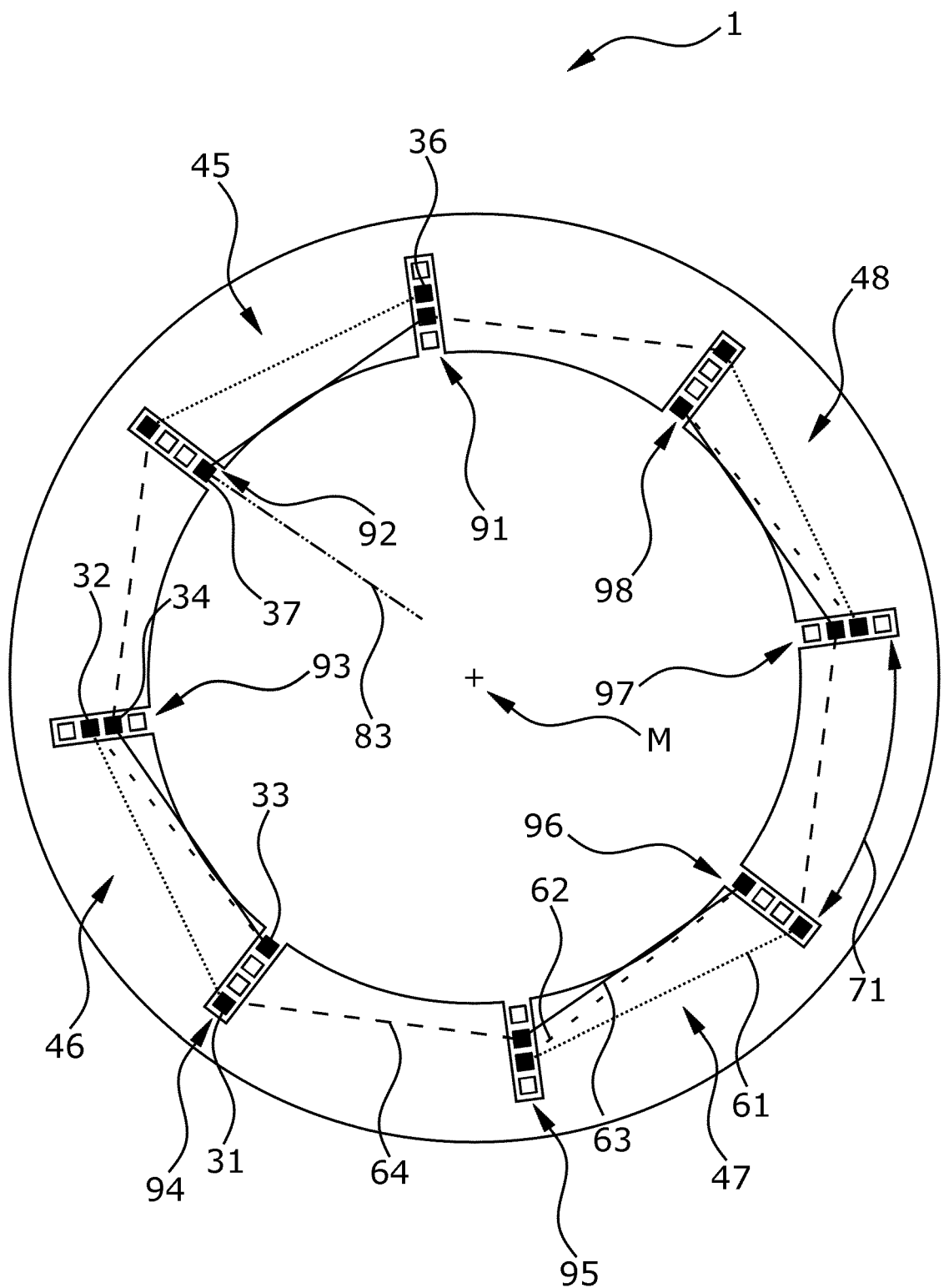
FIG. 4 shows a winding pattern of a second part-coil.

FIG. 4 shows the stator 1 from FIG. 3 and shows eight slots 91, 92, 93, 94, 95, 96, 97, 98, which are located to the left of the slots of FIG. 3 and in the direct vicinity of the slots of FIG. 3.

The pins 31, 32, 33, 34 are connected in series in the same way as the pins 21, 22, 23, 24 of FIG. 3. The respective type of connection is identical to FIG. 3 and is made clear by the same reference signs. The winding 45 constitutes a particular feature and is described in FIG. 5. It is clear from FIG. 4 that the pins of the windings 46, 47, 48 have the same form as in FIG. 3. A first pin 31 of the second part-coil is located in a first slot 94 in the layer L1. This first pin 31 is connected to a second pin 32 in slot 93 by means of the first type of connection 61, illustrated as a dotted line. The second pin 32 is located in the layer L2. The second pin 32 is connected to a third pin 33 in slot 94 by means of the second type of connection 62, illustrated as a short-dashed line. The third pin 33 is located in turn in the first slot 94, that is to say in the same slot as the first pin 31. The third pin 33, however, is in the layer L4. Consequently, there is still space in the slot 98 for two further pins between the first pin 31 and the third pin 33, this being illustrated by two white rectangles in the form of placeholders. The third pin 33 is connected to a fourth pin 34 via the third type of connection 63, illustrated as a solid line. The fourth pin 34 is in the same slot 93 as the second pin 32. The fourth pin 34 is in the layer L3 directly next to the second pin 32. Consequently, there is still space for two further pins in layers L1 and L4 next to the two pins 32, 34 in the slot 97, this being illustrated by two white rectangles in the form of placeholders. The four pins with their connections form a first winding 46.

The first pin 31 is connected to a fourth pin of the second winding 47 via the fourth type of connection, illustrated as a long-dashed line.

With the fourth pin, the above-described serial connection of the subsequent pins in the stator begins again, with the position of the fourth pin of the second winding 47 having been rotated anticlockwise by 90 degrees in relation to the position of the fourth pin 34 of the first winding 46.

The serial connection of the first pin of the second winding 47 to further pins in the slots 97 and 98 forms a third winding 48. The first, second and third types of connection 61, 62, 63 between these pins is identical to the respective first, second and third types of connection 61, 62, 63 of the pins of the first and the second winding 46, 47.

A serial connection of the pins in the stator forms the windings 46, 47, 48 as described above. The winding 45 is formed at the beginning and at the end of the serial connection. The fourth pin 34 of the first winding 46 is connected to a fifth pin 35 in a third slot 92 via the fourth type of connection 64. The fifth pin 35 is in turn connected to a first end pin 36 in slot 91 via a first type of connection 61. The end pin 36 of the second part-coil is connected to the end pin 26 of the first part-coil according to FIG. 5.

After the complete circuit described above, the pin in layer 3 of the slot 91 is also connected to the pin in layer 4 of the slot 92. This latter pin is configured as a single pin and has an output 83 for the connection of an energy source. The four windings 45, 46, 47, 48 thus form the second part-coil.

The circuit of the serial connection of the pins of the second part-coil thus runs in the opposite direction to the pins of the first part-coil. The circulation direction may be selected freely for the two part-coils; they merely have to be different.

Figure 5:
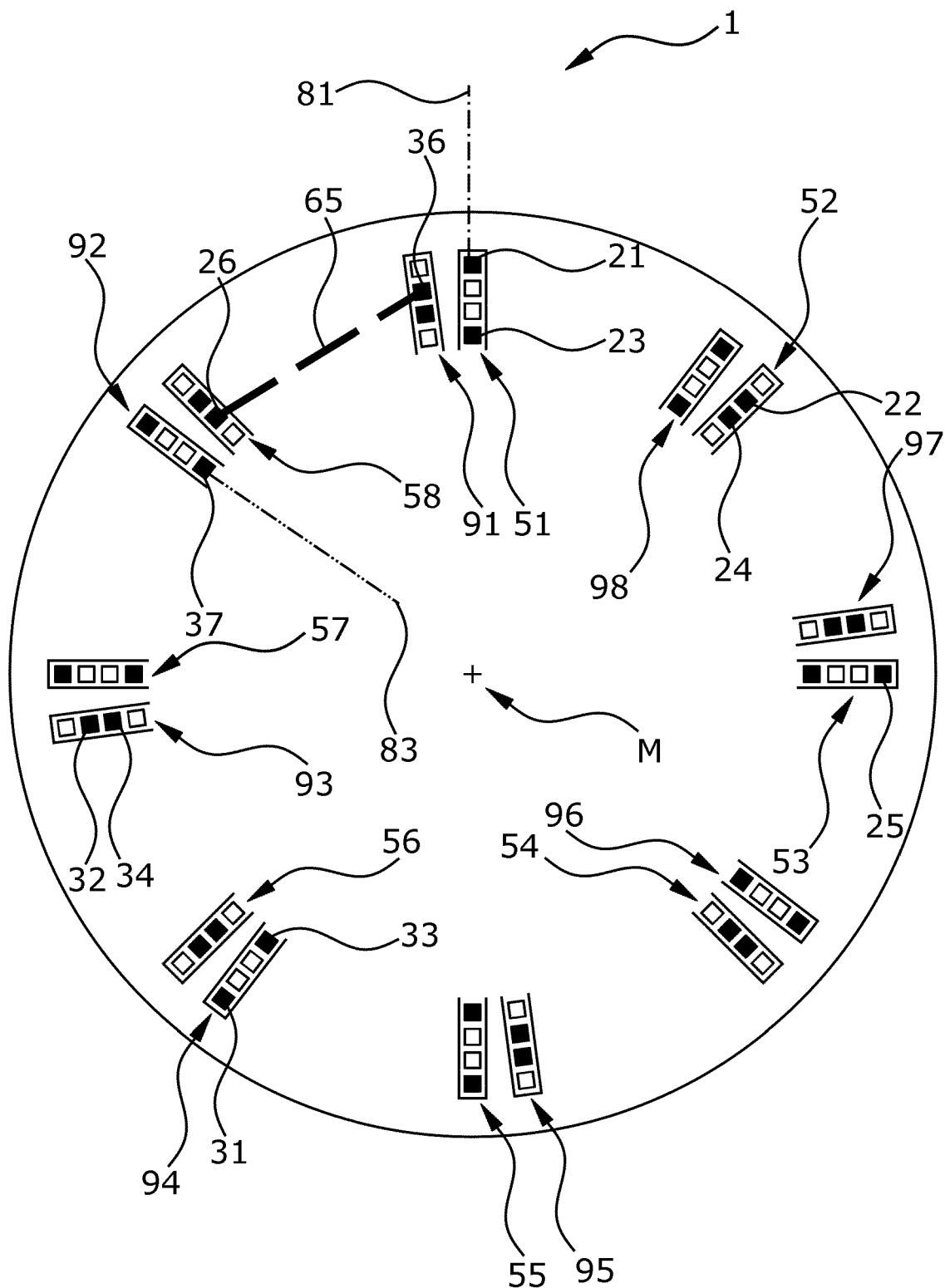
FIG. 5 shows a stator having two part-coils and the connection of said part-coils to one another, and thus a coil.

FIG. 5 shows the connection of the first and the second part-coil from FIGS. 3 and 4, whereby the winding 45 of the second part-coil from FIG. 4 constitutes a special feature.

This winding 45 begins with a first end pin of the second part-coil in layer 2 in the slot 91, which first end pin is connected to the first end pin 26 of the winding 44 of the first part-coil in slot 58 by means of a fifth type of connection 65. This connection is illustrated by a long-dashed bold line in FIG. 5.

The first and the second part-coil are connected by a fifth type of connection 65 between layer L3 in slot 58 and layer L2 in slot 91 and form a first coil 201.

Figure 6:
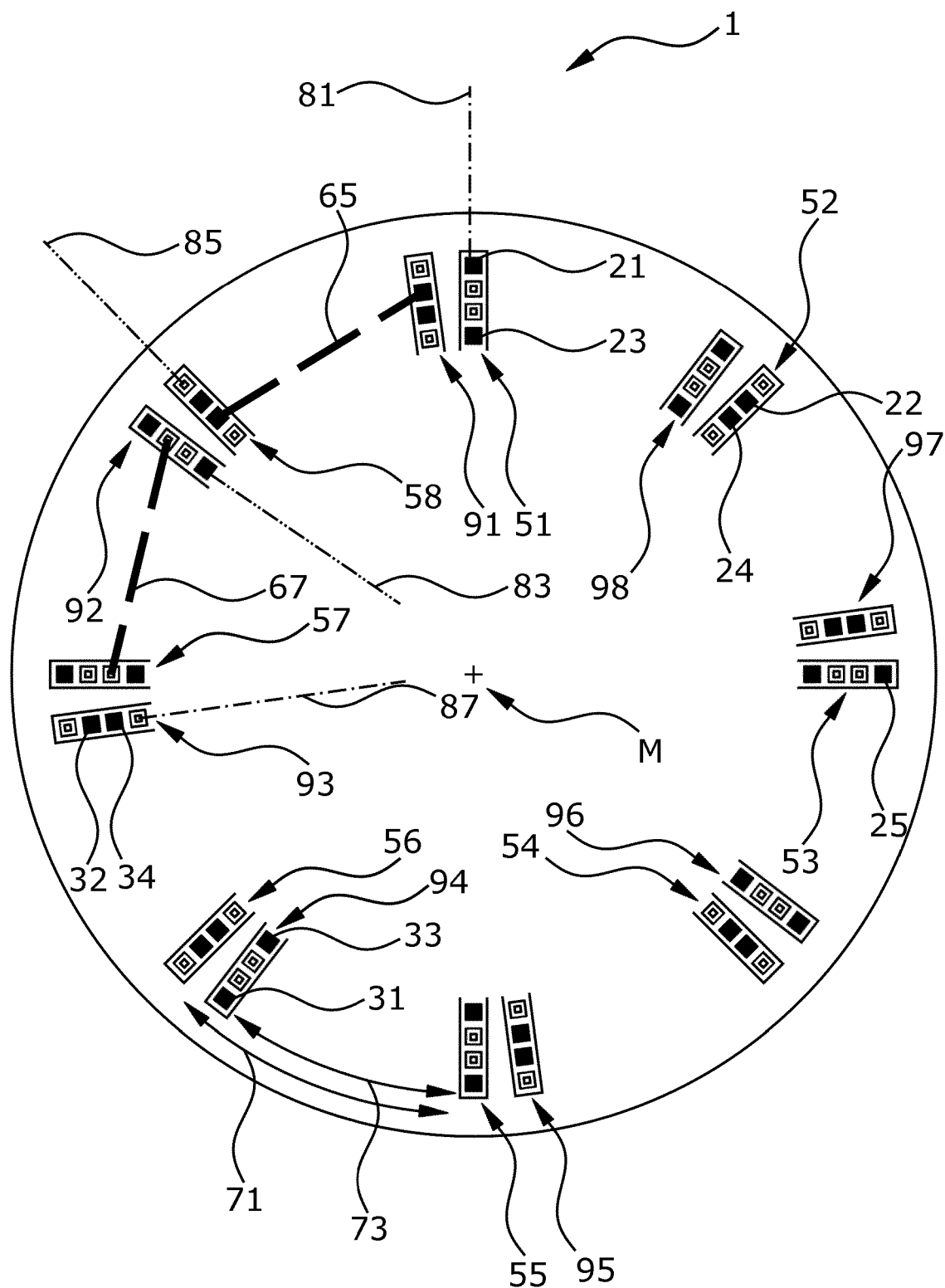
FIG. 6 shows a stator having two coils, consisting of two respective part-coils.

FIG. 6 shows a pin configuration through the two part-coils from FIGS. 3 and 4, which are illustrated by black squares. The same reference signs in these figures denote the same pins, slots and types of connection. Furthermore, two further part-coils according to the principle of FIGS. 3 and 4 are indicated as white squares in the white rectangles, which respectively fill in the free layers in the slots of the first and the second part-coil and thus form a second coil following a winding pattern of the first and the second part-coil. Therefore, FIG. 6 shows two coils, each of which consists of two part-coils.

The connection of the two part-coils of the second coil 202 is illustrated by a long-dashed line 67 and is effected by means of the fifth type of connection.

Figure 11:
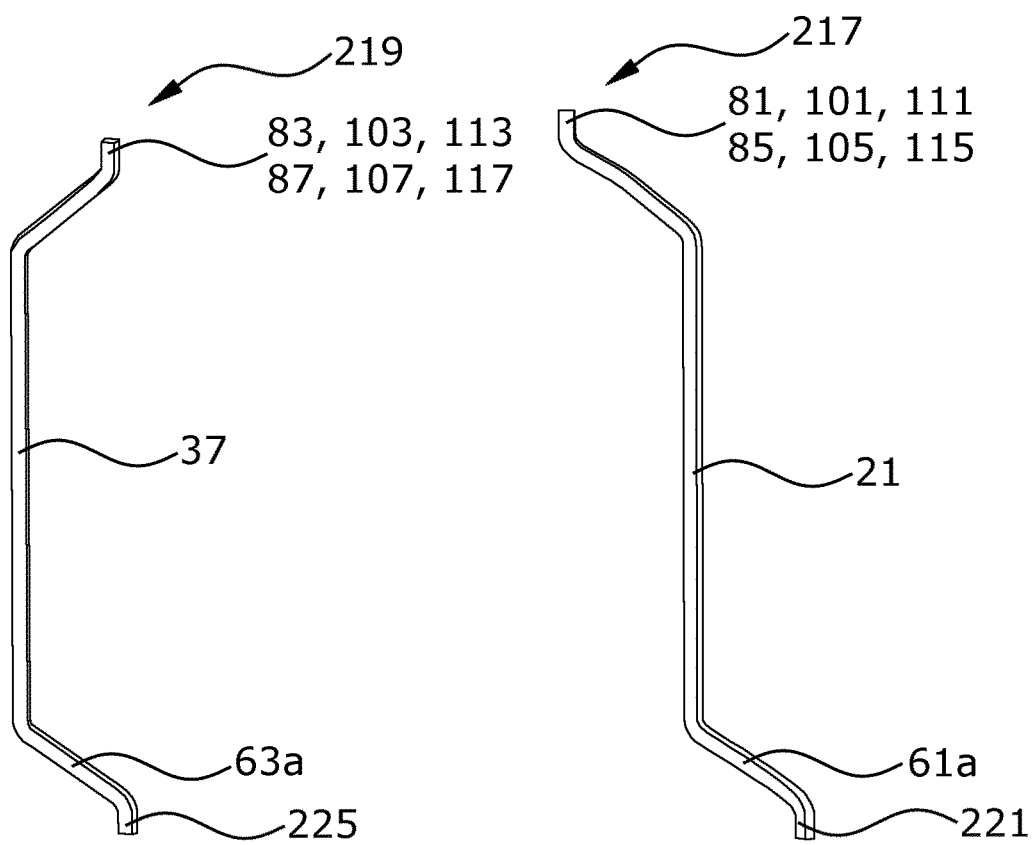
FIG. 11 shows two single pins.

The inputs and outputs of the coils are likewise shown, which inputs and outputs are realized as single pins 217, 219; see FIG. 11. The input 81 of the first coil is located at the slot 51 and the output 83 at the slot 92. The input 87 of the second coil is located at the slot 93 and the output 85 at the slot 58. The second radial distance 73 is for example one slot shorter than the first radial distance 71.

Figure 7:
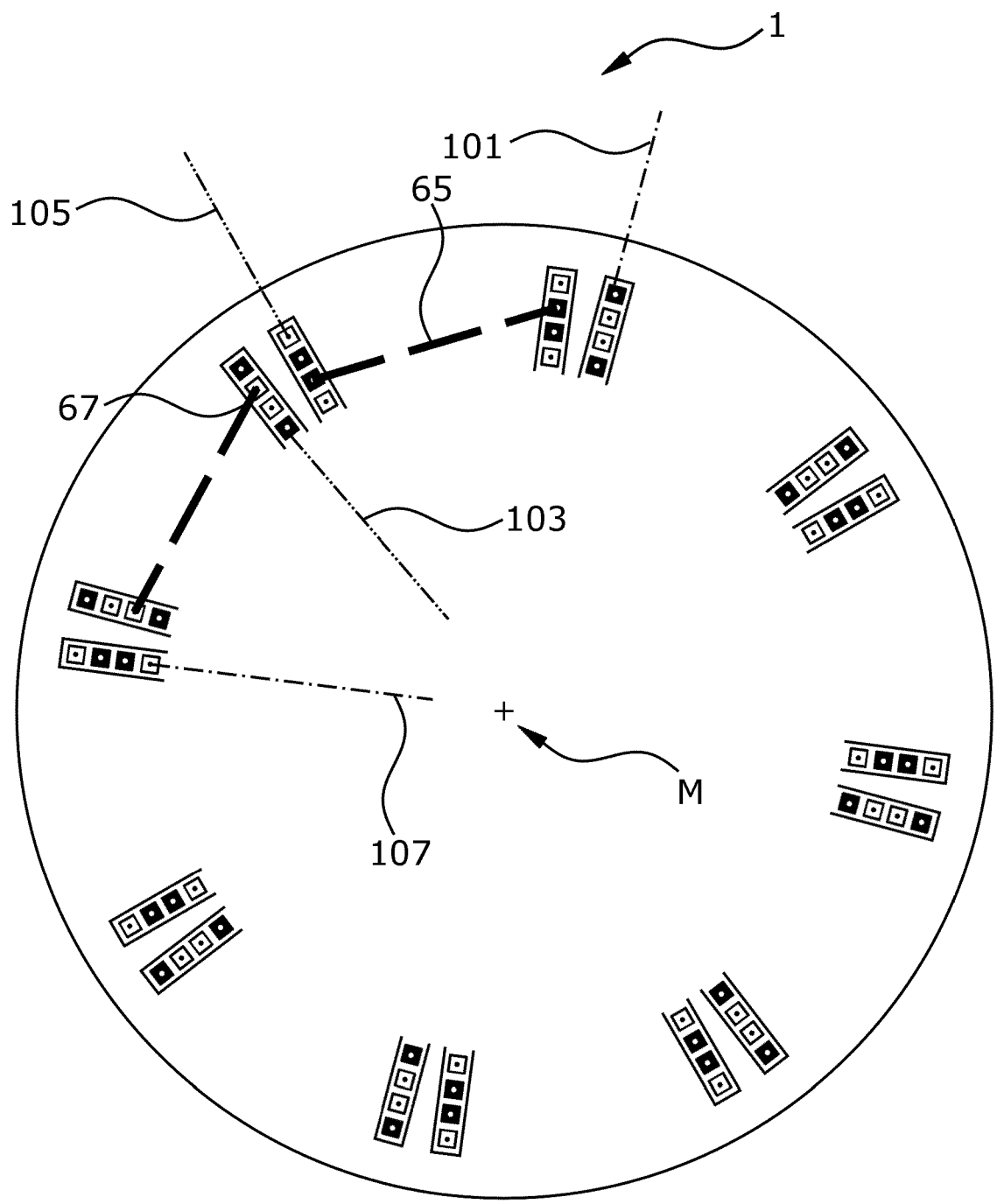
FIG. 7 shows a stator having two further coils.

FIG. 7 shows a pin configuration through a third and a fourth coil in the black squares with a white dot and the white squares with a black dot. This is produced by a winding pattern established in FIGS. 3, 4, 5 and 6, which is offset clockwise by two slots in comparison with the pins and connections illustrated in the latter figures. The inputs 101 and outputs 103 of the third coil and inputs 107 and outputs 105 of the fourth coil are likewise shown.

Figure 8:
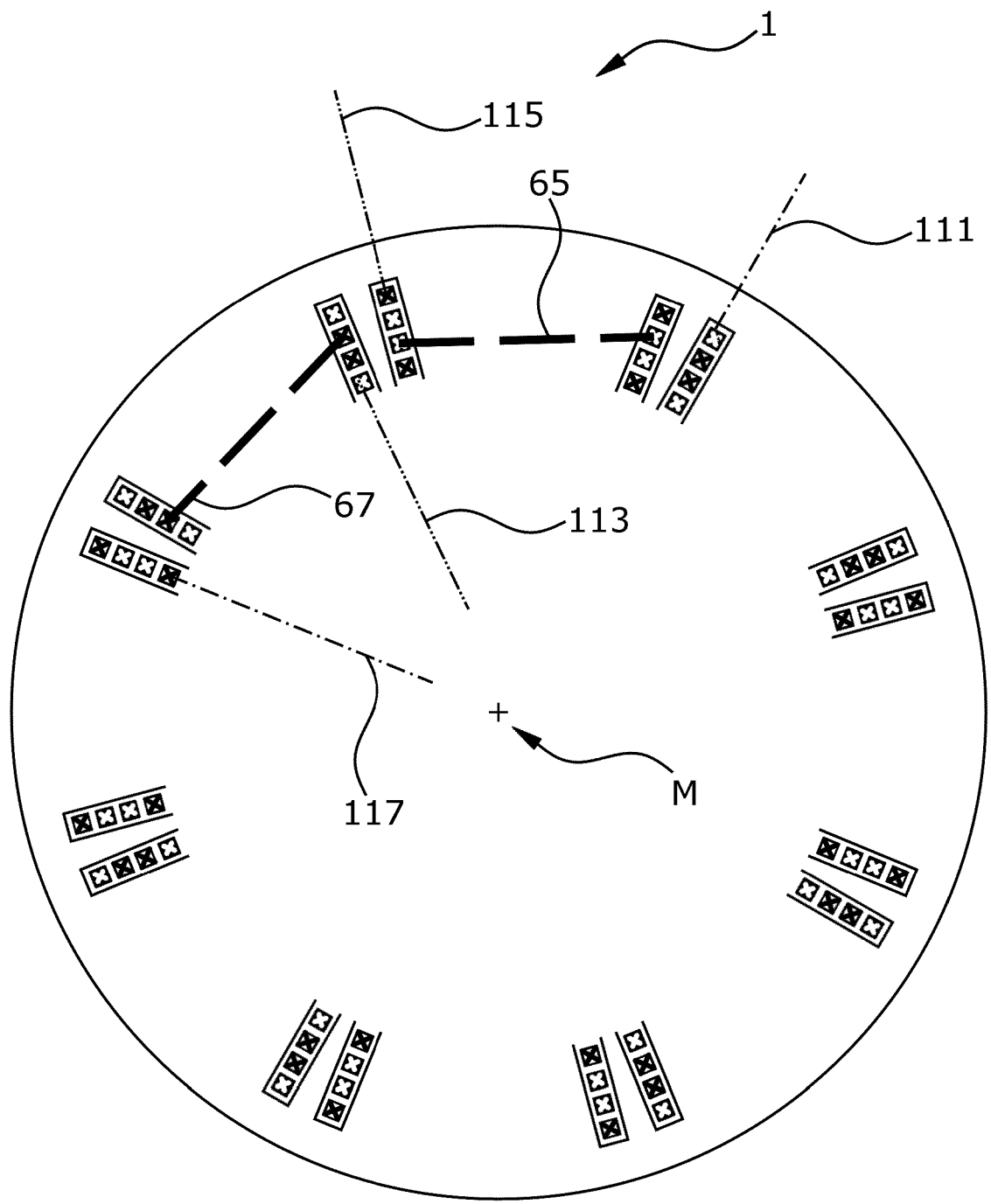
FIG. 8 shows a stator having two further coils.

FIG. 8 shows a pin configuration through a fifth and a sixth coil. This is produced by a winding pattern established in FIGS. 3, 4, 5 and 6, which is offset clockwise by four slots in comparison with the pins and connections illustrated in the latter figures. The inputs 111 and outputs 113 of the fifth coil and inputs 117 and outputs 115 of the sixth coil are likewise shown.

Figure 9:
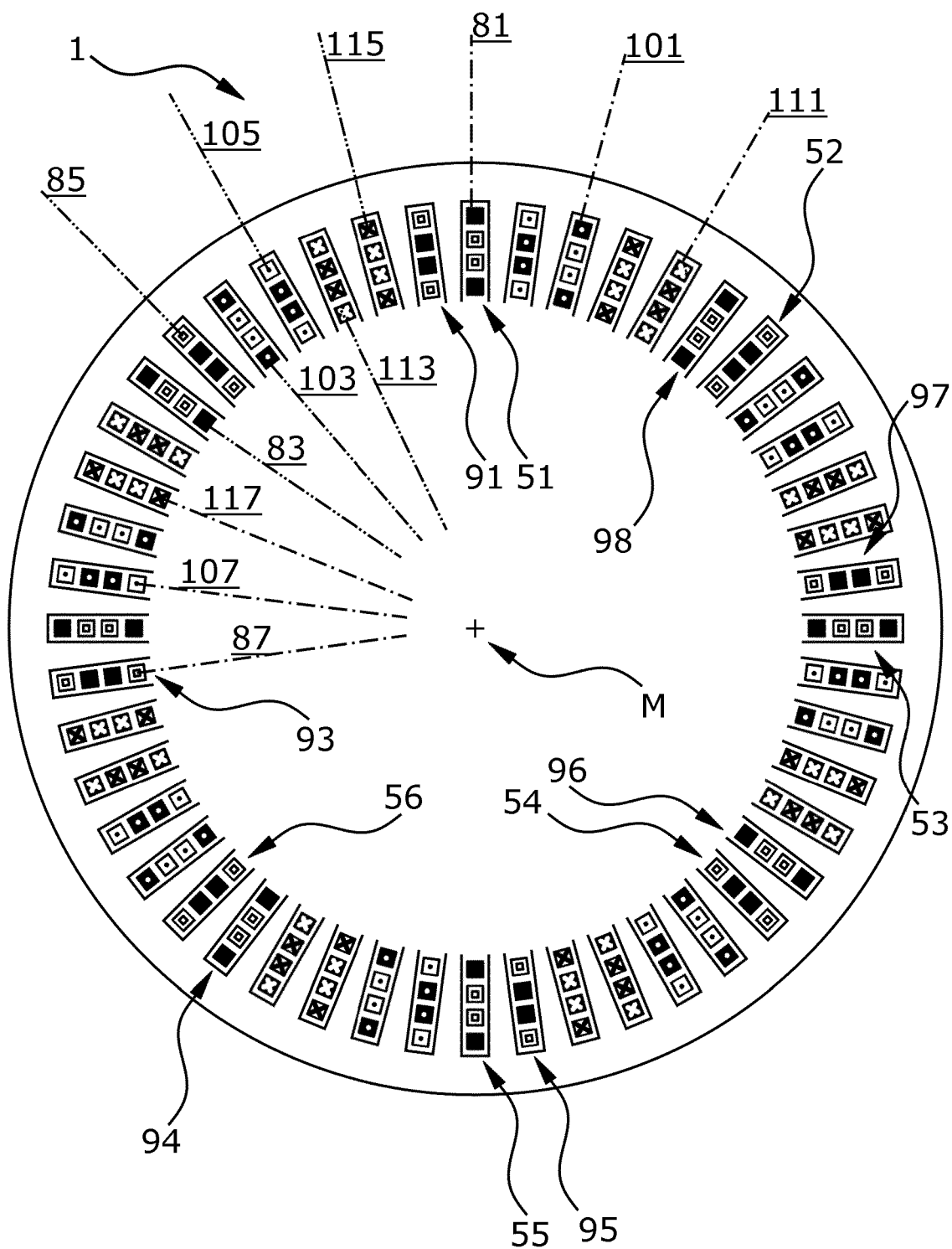
FIG. 9 shows a stator having six coils.

FIG. 9 shows a pin configuration through the six coils in the form of a combination of FIGS. 6, 7 and 8.

Figure 10:
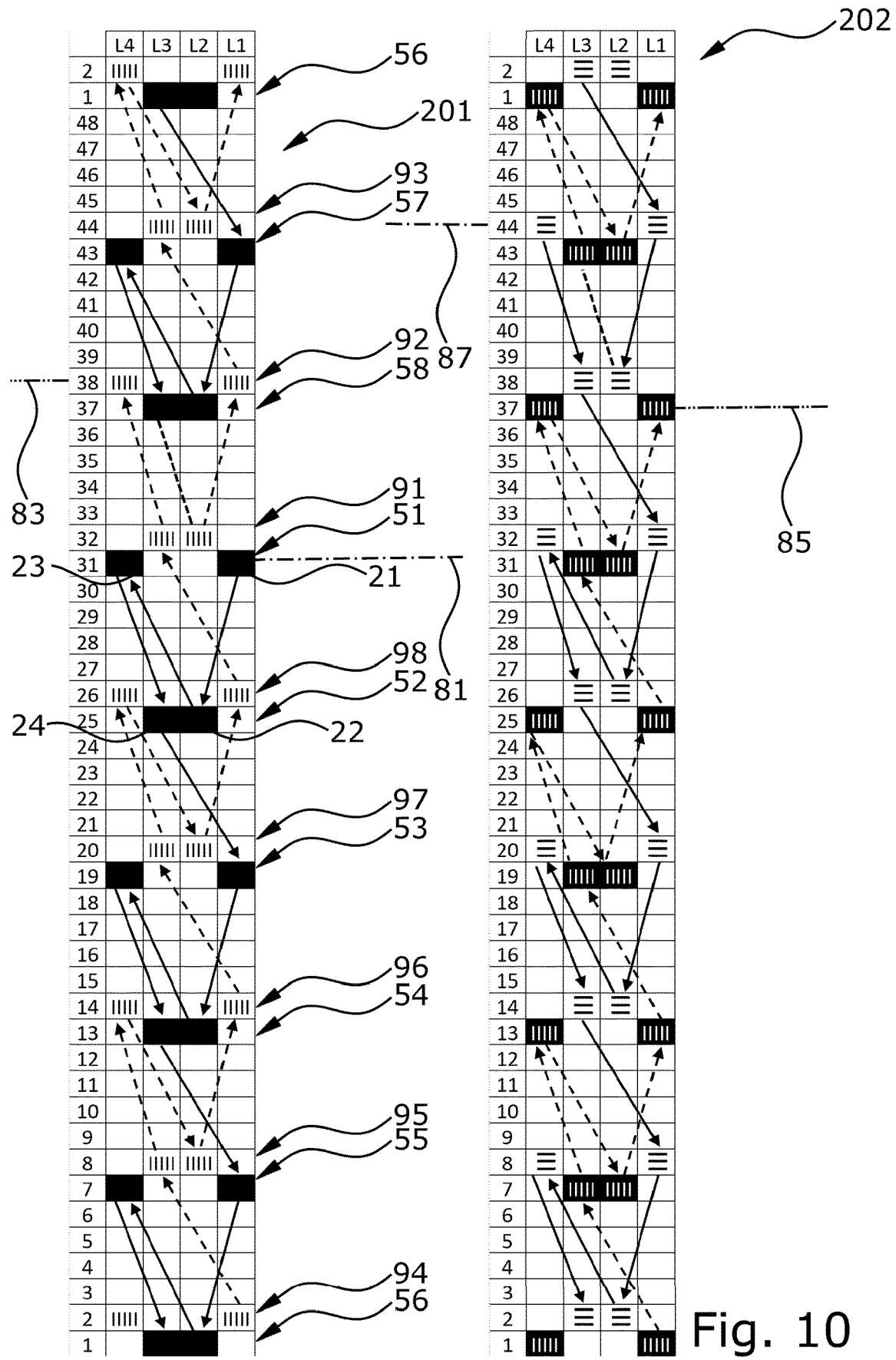
FIG. 10 shows a winding pattern of two coils.

FIG. 10 shows the winding pattern of the first coil 201 and the second coil 202 in the case of a stator having 48 slots and four layers. The third and the fourth coil, and the fifth and the sixth coil, are produced by an offset of two respective slots and are not shown in FIG. 10. The inputs 81, 87 and outputs 83, 85 of the two coils 201, 202 are also illustrated.

FIG. 11 shows two single pins 217, 219 or I-pins. The actual pin which is arranged in the slot of the stator is located in the center. The reference signs are identical to the preceding figures. The pins are illustrated with the first end face upward from the perspective of the stator center point. The input or output 81, 101, 111, 83, 103, 113, 85, 105, 115, 87, 107, 117 is located at the top end. The left-hand single pin 217 is used on layer 4. The right-hand single pin 219 is used on layer 1. At the bottom end, the two pins have a pin foot 63a, 61a with a weld point 221, 225.

Figure 12:
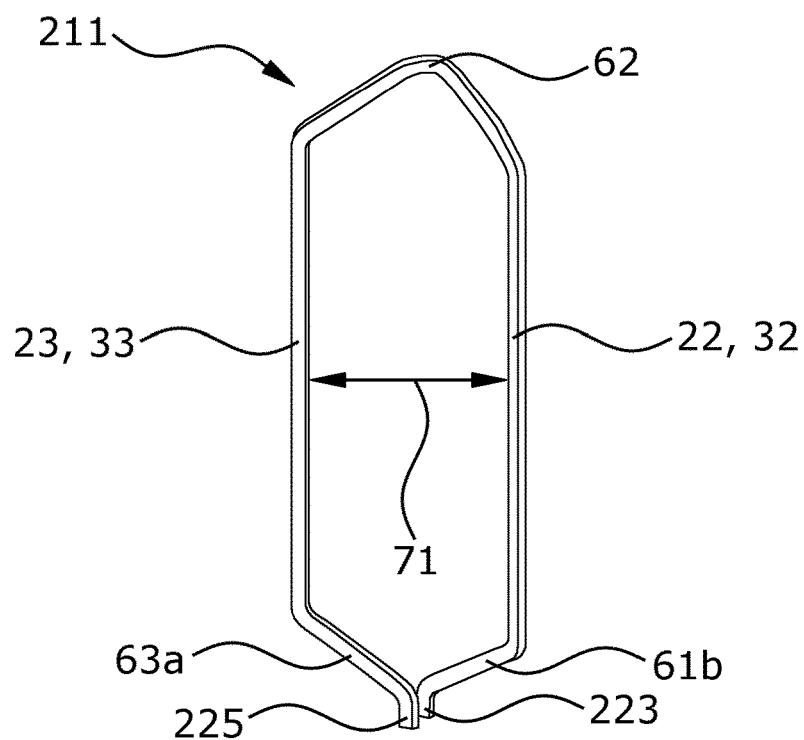
FIG. 12 shows a double pin with inwardly bent pin feet.

FIG. 12 shows a first double pin 211, which is manufactured from a pre-bent, longer pin and which produces the type of connection 62 between a second pin 22, 32 and a third pin 23, 33. The pre-bent connection 62 is located on the first end face 7 and the connection is produced by welding at the weld points 223, 225 of the pin feet 63a, 61b on the second end face 9. The center is in the slot and forms the aforementioned pins with the established reference signs from the preceding figures. The double pin may bridge the distance 71 between the slots.

The connection 61 is formed by the right-hand single pin 217 from FIG. 11 and the first double pin 211 from FIG. 12 by way of the pin feet 61a, 61b by virtue of welding the two weld points 221 and 223 together.

The left-hand single pin 219 of FIG. 11 is similar to the pin 23, 33 of the first double pin 211 of FIG. 12. The pin foot 63a and the weld point 225 are identical. The single pin 219 does not have a connection 62 like the first double pin 211, since the coil ends or begins at the left-hand single pin 219.

Figure 13:
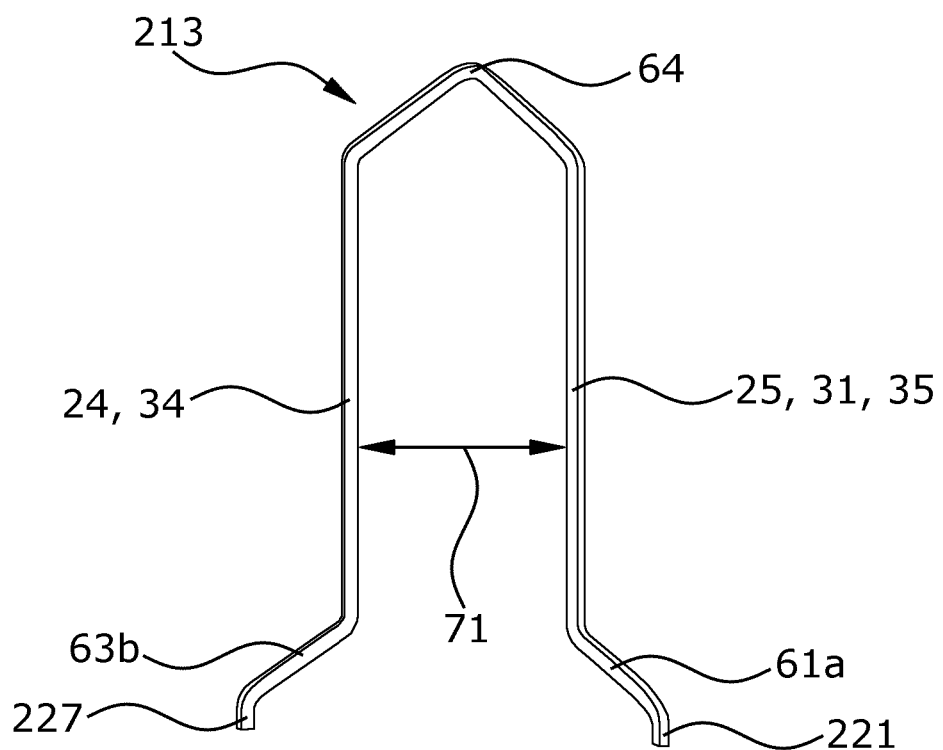
FIG. 13 shows a double pin with outwardly bent pin feet.

FIG. 13 shows a second double pin 213 or U-pin. This pre-bent second double pin 213 forms the connection 64 between the fourth pins 24, 34 and the fifth or first pin 31, 25, respectively. Only the first pin 21 of the first winding of the first part-coil of each coil is designed as a single pin. By way of their weld points 227, 221, the pin feet 63b, 61a arranged at the bottom of the pins form, with the weld points 223, 225 of the pins of FIGS. 11, 12, 14, the types of connection 61 and 63.

The first distance 71 is identical only with respect to the number of slots to be bridged. The actual spatial distance to be bridged is different, because the double pins connect different layers.

The right-hand single pin 217 of FIG. 11 is similar to the pin 25, 31, 35 of the second double pin 217 of FIG. 13. The pin foot 61a and the weld point 221 are identical. The single pin 217 does not have a connection 64 like the second double pin 213, since the coil ends or begins at the right-hand single pin 217.

Figure 14:
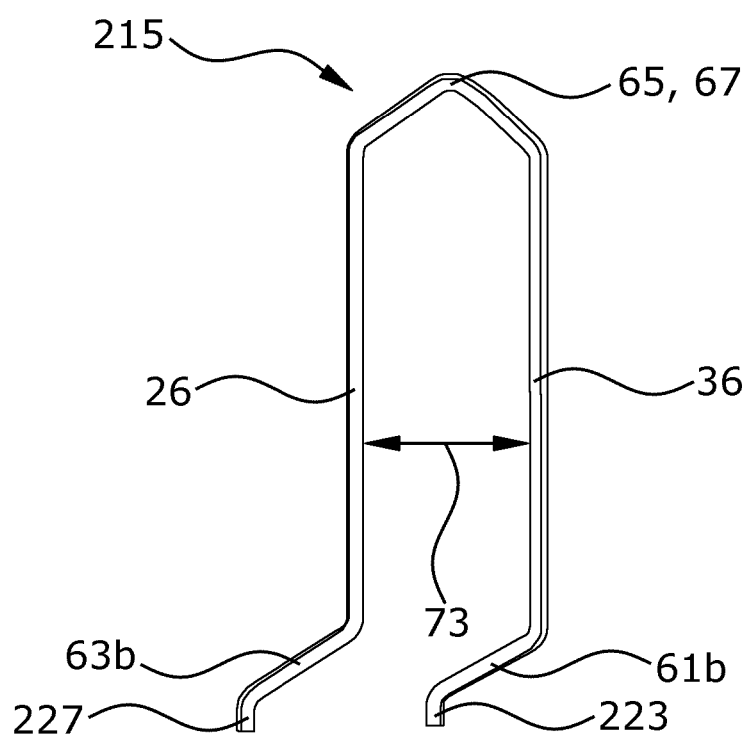
FIG. 14 shows a double pin with one inwardly bent pin foot and one outwardly bent pin foot.

The double pin 215 of FIG. 14 forms the type of connection 65, 67 and is present only once per coil in the form of a particular double pin. The double pin 215 comprises the pins 26, 36 and the pin feet 63b, 61b with the weld points 227, 223, which form the types of connection 61 and 63 with the weld points 225 and 221.

The double pin 215 may bridge the second distance 73, that is to say one slot less than the first distance 71.

The first type of connection 61 is thus formed by way of the pin feet 61a, 61b and the weld points 221 and 223. The third type of connection 63 is thus formed by way of the pin feet 63a, 63b and the weld points 225 and 227.

Figure 15:
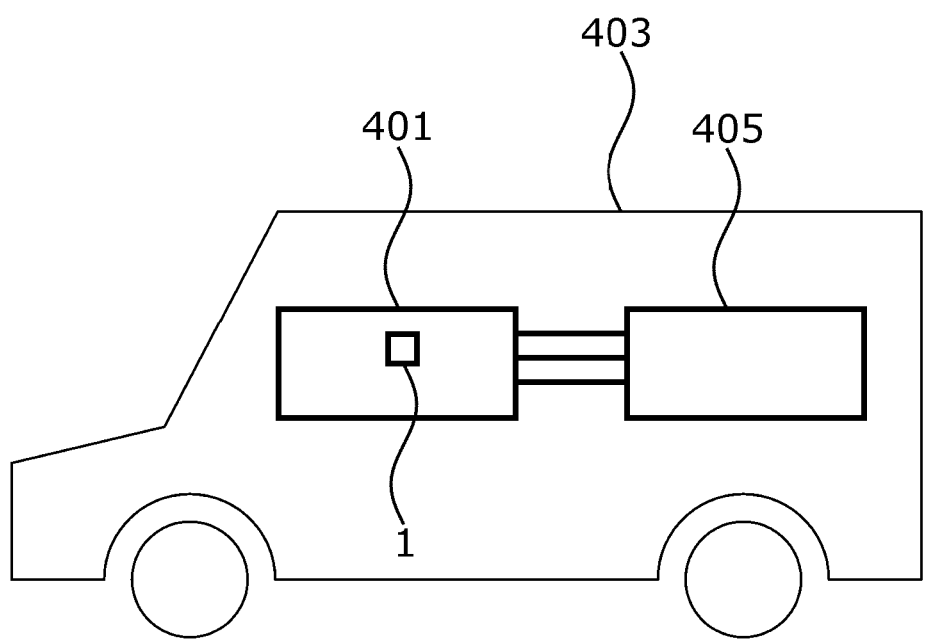
FIG. 15 shows a vehicle having an electric machine, in particular an electric motor, having a stator with an interface.

FIG. 15 is a basic diagram of an exemplary embodiment of a vehicle 403, for example a hybrid vehicle or an electric vehicle, comprising an electric machine 401, in particular an electric motor, with an exemplary embodiment of the stator 1 for driving the vehicle 403.

The vehicle 403 may also comprise an inverter 405, which supplies the electric machine 401 with an alternating current from a direct-current source.

LIST OF REFERENCE SIGNS

1 Stator
2, 21, 22, 23, 24, 25 Pin
31, 32, 33, 34, 35 Pin
5, 51, 52, 53, 54, 55, 56, Slot
57, 58, 91, 92, 93, 94, 95, Slot
96, 97, 98 Slot
7 First end face
9 Second end face
11 Interface
26, 36 End pin
41-48 Winding
61 First type of connection
62 Second type of connection
63 Third type of connection
64 Fourth type of connection
65, 67 Fifth type of connection
66 Sixth type of connection
61a, 61b, 63a, 63b Pin foot
71 Distance
401 Electric machine
81, 87, 101, 107, 111, 117 Input
83, 85, 103, 105, 113, 115 Output
201 First coil
202 Second coil
211, 213, 215 Double pin
217, 219 Single pin
221, 223, 225, 227 Weld point
403 Vehicle
405 Inverter
L1, L2, L3, L4 Layer
M Stator center point

The invention claimed is:

1. A stator for an electric machine, comprising:
a multiplicity of pins, which are arranged on concentric circles at different distances from a stator center point in slots in the stator, and each concentric circle forms a layer,
wherein four pins in different layers are connected to one another in series and form a winding,
wherein a first pin of the four pins of the winding is located in a first slot in a 4n-3 layer, wherein n is a natural number;
wherein a second pin of the four pins of the winding is located in a second slot in a 4n-2 layer, wherein the second slot is at a first radial distance from the first slot in a first circumferential direction of the stator;
wherein a third pin of the four pins of the winding is located in the first slot in a 4n layer;
wherein a fourth pin of the four pins of the winding is located in the second slot in a 4n-1 layer;
wherein the stator has a first end face and a second end face,
wherein the first pin and the second pin are connected to one another on the second end face by a first type of connection,
wherein the second pin and the third pin are connected to one another on the first end face by a second type of connection,
wherein the third pin and the fourth pin are connected to one another on the second end face by a third type of connection, and
wherein the first type of connection, the second type of connection, and the third type of connection differ from one another.

2. The stator according to claim 1, wherein the stator has at least two windings and at least the fourth pin in the second slot is connected to a fifth pin in the 4n-3 layer in a third slot by means of a fourth type of connection.

3. The stator according to claim 2, wherein the fourth type of connection comprises a second double pin, which is formed from the fourth pin and the fifth pin, wherein the second double pin has two outwardly bent pin feet with a respective weld point and bridges the first radial distance.

4. The stator according to claim 2, wherein the stator has a multiplicity of windings, which extend over an entire circumference of the stator and thereby form a part-coil.

5. The stator according to claim 4, wherein respective pins of two part-coils are connected to one another by means of a fifth type of connection.

6. The stator according to claim 5, wherein the fifth type of connection comprises a third double pin, which is formed from two first end pins, wherein the third double pin has two pin feet, which are bent in a same direction and have a respective weld point, and bridges a second radial distance.

7. The stator according to claim 5, wherein at least two part-coils form a coil.

8. The stator according to claim 7, wherein the at least two part-coils form six coils and six phases are assigned to them in such a way that two coils, which are assigned to different phases, are respectively located in adjacent slots.

9. The stator according to claim 7, wherein respective pin inputs of two coils are connected to one another by means of a sixth type of connection.

10. The stator according to claim 9, wherein respective pin outputs of the two coils are connected to one another such that the two coils are connected in parallel and assigned to one phase.

11. The stator according to claim 1, wherein the second type of connection comprises a first double pin, which is formed from the second pin and the third pin, wherein the first double pin has two inwardly bent pin feet with a respective weld point and bridges the first radial distance.

12. The stator according to claim 1, wherein a single pin comprises a second end pin and a pin foot which is bent clockwise.

13. The stator according to claim 1, wherein the first type of connection is formed by a welded connection between a first weld point at a pin foot of a second double pin or of a first single pin and a second weld point at the pin foot of a first double pin or of a third double pin.

14. The stator according to claim 1, wherein the third type of connection is formed by a welded connection between a third weld point at a pin foot of a first double pin or of a second single pin and a fourth weld point at the pin foot of a second double pin or of a third double pin.

15. A vehicle having the electric machine with the stator as claimed in claim 1.

16. A stator for an electric machine, comprising:
a multiplicity of pins, which are arranged on concentric circles at different distances from a stator center point in slots in the stator, and each concentric circle forms a layer,
wherein four pins in different layers are connected to one another in series and form a winding,
wherein a first pin of the four pins of the winding is located in a first slot in a 4n-3 layer,
wherein n is a natural number;
wherein a second pin of the four pins of the winding is located in a second slot in a 4n-2 layer,
wherein the second slot is at a first radial distance from the first slot in a first circumferential direction of the stator;
wherein a third pin of the four pins of the winding is located in the first slot in a 4n layer;
wherein a fourth pin of the four pins of the winding is located in the second slot in a 4n-1 layer; and
wherein the stator has at least two windings and at least the fourth pin in the second slot is connected to a fifth pin in the 4n-3 layer in a third slot by means of a fourth type of connection.

* * * * *